(12) United States Patent
Lal et al.

(10) Patent No.: US 12,152,161 B2
(45) Date of Patent: Nov. 26, 2024

(54) POLYUREA COMPOSITIONS FROM POLYASPARTIC ESTERS AND SECONDARY HETEROCYCLIC AMINES DERIVED ASPARTIC ESTERS

(71) Applicant: Evonik Operations GmbH, Essen (DE)

(72) Inventors: Gauri Sankar Lal, Whitehall, PA (US); Shafiq Fazel, Allentown, PA (US); Stephen Michael Boyce, Bath, PA (US)

(73) Assignee: Evonik Operations GmbH, Essen (DE)

( * ) Notice: Subject to any disclaimer, the term of this patent is extended or adjusted under 35 U.S.C. 154(b) by 958 days.

(21) Appl. No.: 17/047,437

(22) PCT Filed: Apr. 24, 2019

(86) PCT No.: PCT/EP2019/060405
§ 371 (c)(1),
(2) Date: Oct. 14, 2020

(87) PCT Pub. No.: WO2019/211127
PCT Pub. Date: Nov. 7, 2019

(65) Prior Publication Data
US 2021/0147708 A1 May 20, 2021

Related U.S. Application Data

(60) Provisional application No. 62/664,645, filed on Apr. 30, 2018.

(51) Int. Cl.
*C08G 18/73* (2006.01)
*C08G 18/38* (2006.01)
*C09D 175/02* (2006.01)

(52) U.S. Cl.
CPC ....... *C09D 175/02* (2013.01); *C08G 18/3821* (2013.01); *C08G 18/73* (2013.01)

(58) Field of Classification Search
CPC ... C09D 175/02; C08G 18/3821; C08G 18/73
See application file for complete search history.

(56) References Cited

U.S. PATENT DOCUMENTS

| | | | |
|---|---|---|---|
| 5,236,741 A | 8/1993 | Zwiener et al. | |
| 5,623,045 A | 4/1997 | Zwiener et al. | |
| 6,590,066 B1 | 7/2003 | Roesler | |
| 6,737,500 B1 | 5/2004 | Roesler | |
| 2006/0011295 A1* | 1/2006 | Danielmeier | C07C 229/34 156/330.9 |
| 2013/0203934 A1* | 8/2013 | Best | C09D 175/02 |

OTHER PUBLICATIONS

PCT International Search Report mailed Jul. 2, 2019 corresponding to PCT Application No. PCT/EP2019/060405 filed Apr. 24, 2019 (12 pages).

* cited by examiner

*Primary Examiner* — Catherine S Branch
*Assistant Examiner* — Huihong Qiao
(74) *Attorney, Agent, or Firm* — Andrew H. Chung; Linda S. Li; Jason S. Ngui

(57) ABSTRACT

The present invention relates to a polyurea coating composition comprising (A) a polyisocyanate; (B) a polyaspartic ester; and (C) an aspartic ester. The polyaspartic ester (B) is represented by the structure below:

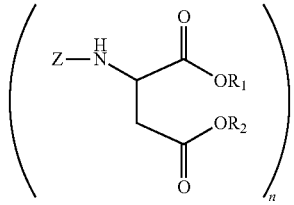

where Z=a cycloalkyl, alkyl or aryl group, $R_1$, $R_2$=alkyl groups containing 1-10 carbon atoms; and n=2-4. The aspartic ester (C) is derived from a secondary heterocyclic amine in a 3-7 membered ring compound bearing at least one secondary amine functionality. This invention also relates to use of a polyurea coating composition comprising (A)-(C) for the preparation of a polyurea coating. This invention further relates to a process for preparing a polyaspartic/aspartic ester mixture in-situ by initially reacting an ester of fumaric acid or maleic acid with a polyamine and then reacting the unreacted ester of fumaric acid or maleic acid to completion with a secondary heterocyclic amine. This method makes it possible to prepare a polyurea coating without maleic acid or fumaric acid esters thereby providing a safer and more environmentally friendly product.

4 Claims, No Drawings

POLYUREA COMPOSITIONS FROM POLYASPARTIC ESTERS AND SECONDARY HETEROCYCLIC AMINES DERIVED ASPARTIC ESTERS

This Application is a § 371 national stage of PCT International Application No. PCT/EP2019/060405, filed Apr. 24, 2019, which claims the benefit of U.S. Application No. 62/664,645, filed Apr. 30, 2018, the contents of which are hereby incorporated by reference in its entirety into this application.

BACKGROUND OF THE INVENTION

Polyurea coating compositions having a polyisocyanate binder component and a polyaspartic ester curing agent for reaction with polyisocyanate are known in the art. They have been used for the preparation of coatings that are resistant to weathering, abrasion and solvents. In addition, they may be made rigid and elastic.

Polyaspartic esters which contain secondary polyamines in combination with lacquer polyisocyanates are described in EP-A-0,403,921 for the preparation of coatings without solvent or with a minimal amount of solvent. In EP-A-0,531,249 coating compositions of polyaspartic esters are used in combination with hydroxyl-containing resins, polyaldimines or ketimines as the iso-cyanate reactive component.

Polyaspartic esters are generally prepared by the reaction of a polyamine with a dialkyl ester of maleic or fumaric acid. If the preparation starts with the maleic acid ester there is a rapid isomerization to the fumaric acid ester which then reacts with the polyamine to generate the polyaspartic ester. The reaction of polyamines with the generated fumaric ester is much slower than with maleic ester. Consequently, excess starting materials are always present after the production of polyaspartic esters. In U.S. Pat. Nos. 5,236,741 and 5,623,045, the starting materials were removed by distillation. This is an expensive and laborious process.

The problem on which the present invention is based is that the polyaspartic ester prepared from diethyl maleate/fumarate with bis(4-aminocyclohexyl) methane in a 1:1 molar ratio of reactants takes several weeks to achieve near quantitative conversion of the maleate/fumarate starting material. A similar process used to prepare the polyaspartic ester using (3-methyl-4-aminocyclohexyl) methane takes at least three months to achieve near quantitative conversion. As a result, the use of these products in commerce is severely hampered as customers have to wait a very long time between manufacture and receipt of products.

U.S. Pat. No. 6,737,500 describes a method for removing the excess maleic/fumaric ester from the polyaspartic ester production process by carrying out the reaction in two-steps. After an initial reaction of a cyclic amine with an ester of fumaric or maleic acid, an acyclic amine was added to react with the excess fumaric or maleic ester. A similar process was used in U.S. Pat. No. 6,590,066 B1 to remove the excess fumaric/maleic ester using an acyclic amine after an initial reaction of the maleic/fumaric acid ester with a polypropylene oxide amine. These patents describe the production of polyaspartic ester mixtures. The polyaspartic ester derived from cyclic amines and polypropylene oxide amines react much slower with polyisocyanates than those derived from acyclic amines. Hence the working time or pot life of these mixtures are much reduced in coatings applications. This can cause pre-mature gelation of the polyurea coatings and resulting difficulty in application of such mixtures to the substrate to be coated.

There is a need in this art for polyaspartic esters without fumaric or maleic acid esters contaminants which can be produced in a timely and efficient manner and which can be used for production of polyurea coatings without impacting the cured properties of these coatings.

BRIEF SUMMARY OF THE INVENTION

This invention relates to a polyurea coating composition comprising
(A) a polyisocyanate;
(B) a polyaspartic ester represented by the structure below:

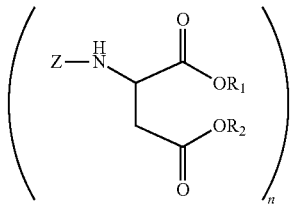

Z=a cycloalkyl, alkyl or aryl group, $R_1$, $R_2$=alkyl groups containing 1-10 carbon atoms; and n=2-4; and
(C) an aspartic ester derived from a secondary heterocyclic amine in a 3-7 membered ring compound bearing at least one secondary amine functionality.

This invention also relates to a process for the preparation of a polyurea coating by using a mixture of the following components:
(A) a polyisocyanate;
(B) a polyaspartic ester represented by the structure below:

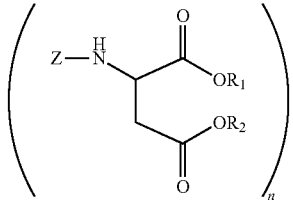

Z=a cycloalkyl, alkyl or aryl group, $R_1$, $R_2$=alkyl groups containing 1-10 carbon atoms; and n=2-4; and
(C) an aspartic ester derived from a secondary heterocyclic amine in a 3-7 membered ring compound bearing at least one secondary amine functionality.

This invention also relates to a process for preparing a polyaspartic/aspartic ester mixture in-situ by initially reacting an ester of fumaric acid or maleic acid with a polyamine and then reacting the unreacted ester of fumaric acid or maleic acid to completion with a secondary heterocyclic amine. This method makes it possible to prepare a polyurea coating without maleic acid or fumaric acid esters thereby providing a safer and more environmentally friendly product.

DETAILED DESCRIPTION OF INVENTION

This invention relates to a polyurea coating composition comprising
(A) a polyisocyanate;
(B) a polyaspartic ester represented by the structure below:

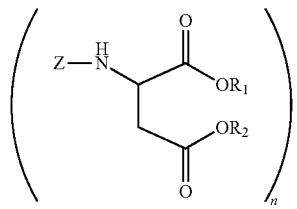

Z=a cycloalkyl, alkyl or aryl group, $R_1$, $R_2$=alkyl groups containing 1-10 carbon atoms; and n=2-4; and
(C) an aspartic ester derived from a secondary heterocyclic amine in a 3-7 membered ring compound bearing at least one secondary amine functionality.

This disclosure also relates to a method for the preparation of a mixture of a polyaspartic ester and an aspartic ester of a secondary heterocyclic amine in-situ which is used to prepare a polyurea coating on reaction with polyisocyanates.

The polyaspartic ester is represented by the structure below:

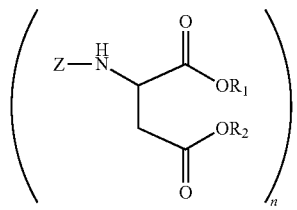

Z=a cycloalkyl, alkyl or aryl group, $R_1$, $R_2$=alkyl groups containing 1-10 carbon atoms; and n=2-4.

This polyaspartic ester is obtained by a Michael reaction of an ester of maleic acid or fumaric acid with a cycloaliphatic or acyclic diamine or triamine. Preferred examples of suitable maleic and fumaric esters include diethyl maleate, dipropyl maleate, dibutyl maleate, methyl propyl maleate, ethyl propyl maleate, and the like. Preferred examples of suitable dialkyl fumarates include, diethyl fumarate, dipropyl fumarate, dibutyl fumarate, methyl propyl fumarate, ethyl propyl fumarate, and mixtures thereof.

The amine component is preferably selected from difunctional or trifunctional cycloalkyl and straight or branched chain alkyl amines. Preferred examples of suitable amines are 2,4'- and/or 4,4'-diaminodicyclohexylmethane, and 3,3'-dimethyl-4,4'-diaminodicyclohexylmethane. Further preferred cycloalkyl amines include Bis-(3-methyl-4-aminocyclohexyl) methane, 2,4-diamino-1-methyl cyclohexane, 2,6-diamino-1-methyl cyclohexane, 2,4- and/or 2,6-hexahydrotoluenediamine. Further preferred aromatic polyamines such as 2,4- and/or 2,6-diaminotoluene, 2,4'- and/or 4,4'-diaminodiphenyl, and 2,4'- and/or 4,4'-methylenedianiline, are also suitable but less preferred. Further preferred straight and branched chain alkyl amines include ethylene diamine, 1,2-diaminopropane, 1,4-diaminobutane, 1,6-diaminohexane, 2,5-dimethylhexane, 2,2,4- and/or 2,4,4-trimethyl-1,6-diaminohexane, 1,11-diaminoundecane, 1,12-diaminododecane, and 1-amino-3,3,5-trimethyl-5-aminomethylcyclohexane.

Further preferred suitable trifunctional amines include 4-aminomethyl-1,8-diaminooctane (also known as triaminononane supplied by Ascend Corp.), and tris-(2-aminoethyl)amine. Further preferred tetrafunctional amines, e.g., N,N,N',N'-tetrakis-(2-aminoethyl)-1,2-ethanediamine are also suitable.

Preferably, Z is the cycloalkyl, alkyl or aryl group attached to the amino groups of 2,4'- and/or 4,4'-diaminodicyclohexylmethane, 3,3'-dimethyl-4,4'-diaminodicyclohexylmethane, Bis-(3-methyl-4-aminocyclohexyl) methane, 2,4-diamino-1-methyl cyclohexane, 2,6-diamino-1-methyl cyclohexane, 2,4- and/or 2,6-hexahydrotolylenediamine, ethylene diamine, 1,2-diaminopropane, 1,4-diaminobutane, 1,6-diaminohexane, 2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 4-aminomethyl-1,8-diaminooctane, tris-(2-aminoethyl)amine, 2,4- and/or 2,6-diaminotoluene, 2,4'- and/or 4,4'-diaminodiphenylamine, or 2,4'- and/or 4,4'-methylenedianiline.

This invention also relates to a process for preparing a polyaspartic/aspartic ester mixture in-situ by initially reacting an ester of fumaric acid or maleic acid with a polyamine and then reacting the unreacted ester of fumaric acid or maleic acid to completion with a secondary heterocyclic amine. Preferably, the polyamine reacted with an ester of fumaric acid or maleic acid is a cycloaliphatic or acyclic diamine or triamine.

Preferably, the cycloaliphatic or acyclic diamine or triamine is selected from the group consisting of 2,4'- and/or 4,4'-diaminodicyclohexylmethane, 3,3'-dimethyl-4,4'-diaminodicyclohexylmethane, Bis-(3-methyl-4-aminocyclohexyl) methane, 2,4-diamino-1-methyl cyclohexane, 2,6-diamino-1-methyl cyclohexane, 2,4- and/or 2,6-hexahydrotoluenediamine, ethylene diamine, 1,2-diaminopropane, 1,4-diaminobutane, 1,6-diaminohexane, 2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 4-aminomethyl-1,8-diaminooctane, or tris-(2-aminoethyl) amine.

During the formation of the polyaspartic ester component, an ester of fumaric or maleic acid is reacted with the diamine or triamine in a first step of the process. In one embodiment, the molar ratio of the diamine to the maleic or fumaric ester is in the range of 1:3 to 1:2. In another embodiment, the molar ratio of the diamine to the maleic or fumaric ester is in the range of 1:2.5 to 1:2.2. In another embodiment, the molar ratio of the diamine to the maleic or fumaric ester is 1:2. In reaction of the ester of maleic or fumaric acid with a triamine, in one embodiment the molar ratio of the triamine to the maleic or fumaric ester is in the range of 1:4 to 1:3. In another embodiment, the molar ratio of the triamine to the maleic or fumaric ester is 1:3.5. In another embodiment, the molar ratio of the triamine to the maleic or fumaric ester is 1:3.0. This reaction is generally carried out in about eight hours. Preferably, the reaction takes place at a temperature of 25° C. to 100° C. The reaction may take place in the absence or in the presence of suitable solvents such as methanol, ethanol, propanol, ethyl- or butyl acetate and mixtures of these solvents. The pressure of the reaction is generally atmospheric.

In the second step of the process, the polyaspartic ester formed initially with unreacted fumarate or maleate ester is reacted with a secondary heterocyclic amine. In this process the excess fumarate and maleate are consumed by reaction with the secondary heterocyclic amine to generate a mixture of polyaspartic ester and aspartic ester. The amount of the heterocyclic amine used is based on the amount of fumarate and maleate ester present after the initial polyaspartic ester synthesis process. This is determined by analysis of the reaction mixture by gas chromatography or similar analytical technique. Preferably, the molar ratio of unreacted fumarate and maleate ester combined to the secondary amine used is about 1.0. Preferably, the weight ratio of polyaspartic ester to aspartic ester is in the range of 98:2 to 75:25. Further preferred, in some cases the ratio is 80:20 and in other cases 92:8. An example of this process is illustrated by the reaction of piperidine (a secondary heterocyclic amine) with diethyl fumarate.

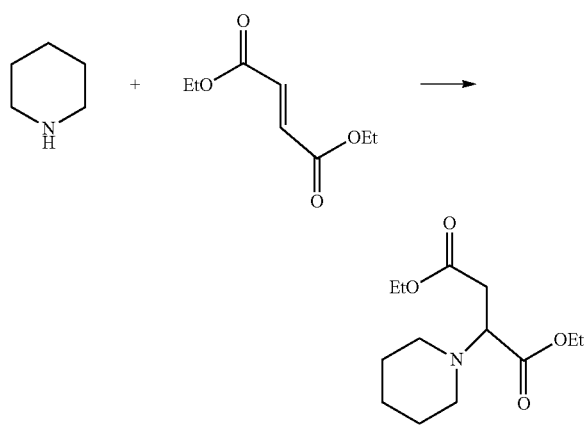

Suitable secondary heterocyclic amines used in this process contain 2-6 carbon atoms in 3-7 membered rings bearing at least one secondary amine functionality. Preferred examples of these compounds are aziridine, azetidine, pyrrolidine, piperidine, piperazine, 1-N-alkylpiperazine (alkyl contains 1-12 carbon atoms), 1-N-arylpiperazine (aryl contains 6 carbon atoms), morpholine and azepane as well as compounds with alkyl or aryl substituents on the carbon atoms of these compounds. Preferably, the alkyl or aryl substituents may contain 1-20 carbon atoms.

Preferably, the polyisocyanate component used to react with the polyaspartic ester/aspartic ester mixture include 1,4-diisocyanatobutane, 1,6-hexamethylene diisocyanate, 2,2,4- and/or 2,4,4-trimethyl-1,6-hexamethylene diisocyanate, dodecamethylene diisocyanate, 1,4-diisocyanatocyclohexane, 1-isocyanato-3,3,5-trimethyl-5-isocyanatomethyl-cyclohexane (IPDI), 2,4'- and/or 4,4'-diisocyanato-dicyclohexyl methane, 2,4- and/or 4,4'-diisocyanatodiphenyl methane and mixtures of these isomers with their higher homologues that are obtained in a known manner by the phosgenation of aniline/formaldehyde condensate, 2,4- and/or 2,6-diisocyanatotoluene and any mixtures of these compounds. Preferred cyclic isocyanates include diphenylmethane 4,4'-diisocyanate (MDI), diphenylmethane 2,4'-diisocyanate, 2,4- and/or 2,6-diisocyanatotoluene. Preferred aliphatic isocyanates include hexamethylene diisocyanate, isophorone diisocyanate, 2,4'- and/or 4,4'-diisocyanato-dicyclohexyl methane.

Preferred additional suitable polyisocyanate components include derivatives of the above-mentioned monomeric polyisocyanate, as is conventional in coatings technology. Preferably, these derivatives include polyisocyanate containing biuret groups as described, for example, in U.S. Pat. Nos. 3,124,605 and 3,201,372 and DE-OS 1,101,394, incorporated herein by reference in their entirety; polyisocyanate containing isocyanurate groups as described in U.S. Pat. No. 3,001,973, DE-PS 1,022,789, 1,222,067 and 1,027,394 and DE-OS 1,929,034 and 2,004,048, incorporated herein by reference in their entirety; polyisocyanate containing urethane groups as described, for instance, in DE-OS 953,012, BE-PS 752,261 and U.S. Pat. Nos. 3,394,164 and 3,644,457; polyisocyanate containing carbodiimide groups as described in DE-PS 1,092,007, U.S. Pat. No. 3,152,162 and DE-OS 2,504,400, 2,537,685 and 2,552,350, incorporated herein by reference in their entirety; and polyisocyanate containing allophanate groups as described, for example, in GB-PS 994,890, BE-PS 761,626 and NL-OS 7,102,524. Further preferred polyisocyanate also include polyisocyanate that contain uretdione groups. In one embodiment, asymmetric trimers such as those in U.S. Pat. No. 5,717,091, incorporated herein by reference in its entirety, are also suitable. Further preferred isocyanate group-containing prepolyrners and semi-prepolymers based on polyisocyanate can also be used as the polyisocyanate component. In one embodiment, these prepolymers and semi-prepolymers preferably have an isocyanate content ranging from about 0.5 to 30% by weight. In another embodiment, these prepolymers and semi-prepolymers preferably have an isocyanate content ranging from about 1 to 20% by weight. In one embodiment, these prepolymers and semi-prepolymers are prepared in a known manner by the reaction of starting materials, e.g., isocyanate-reactive compounds such as polyols, at an NCO/OH equivalent ratio of about 1.05:1 to 10:1. In another embodiment, these prepolymers and semi-prepolymers are prepared at an NCO/OH equivalent ratio of about 1.1:1 to 3:1.

The following invention is directed to the following aspects:
<1> A polyurea coating composition comprising
(A) a polyisocyanate;
(B) a polyaspartic ester represented by the structure:

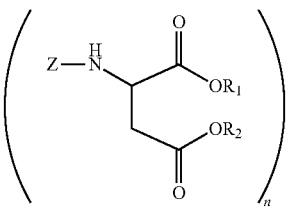

wherein Z=a cycloalkyl, alkyl or aryl group, $R_1$, $R_2$=alkyl groups containing 1-10 carbon atoms; and n=2-4; and
(D) an aspartic ester derived from a secondary heterocyclic amine in a 3-7 membered ring compound bearing at least one secondary amine functionality.
<2> The composition of aspect <1> wherein the secondary heterocyclic amine is selected from the group consisting of aziridine, azetidine, pyrrolidine, piperidine, piperazine, a 1-N-alkylpiperazine wherein the alkyl contains 1-12 carbon atoms, a 1-N-arylpiperazine wherein the aryl contains 6 carbon atoms, morpholine and azepane.

<3> The composition of aspect <1> wherein Z is the cycloalkyl, alkyl or aryl group attached to at least one of the amino groups of 2,4'- and/or 4,4'-diaminodicyclohexylmethane, 3,3'-dimethyl-4,4'-diaminodicyclohexylmethane, Bis-(3-methyl-4-aminocyclohexyl) methane, 2,4-diamino-1-methyl cyclohexane, 2,6-diamino-1-methyl cyclohexane, 2,4- and/or 2,6-hexahydrotoluenediamine, ethylene diamine, 1,2-diaminopropane, 1,4-diaminobutane, 1,6-diaminohexane, 2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 4-aminomethyl-1,8-diaminooctane, tris-(2-aminoethyl)amine, 2,4- and/or 2,6-diaminotoluene, 2,4'- and/or 4,4'-diaminodiphenylamine, or 2,4'- and/or 4,4'-methylenedianiline.

<4> The composition of aspect <1> wherein the polyisocyanate is selected from the group consisting of 1,4-diisocyanatobutane, 1,6-hexamethylene diisocyanate, 2,2,4- and/or 2,4,4-trimethyl-1,6-hexamethylene diisocyanate, dodecamethylene diisocyanate, 1,4-diisocyanatocyclohexane, 1-isocyanato-3,3,5-trimethyl-5-isocyanatomethylcyclohexane, 2,4'- and/or 4,4'-diisocyanato-dicyclohexyl methane, 2,4- and/or 4,4'-diisocyanatodiphenyl methane, 2,4- and/or 2,6-diisocyanatotoluene, diphenylmethane 4,4'-diisocyanate, diphenylmethane 2,4'-diisocyanate, 2,4- and/or 2,6-diisocyanatotoluene, hexamethylene diisocyanate, isophorone diisocyanate, or 2,4'- and/or 4,4'-diisocyanato-dicyclohexyl methane.

<5> Use of a polyurea coating composition according to one of claims 1-4 for the preparation of a polyurea coating.

<6> A process for preparing a polyaspartic/aspartic ester mixture comprising the steps of:
  a) reacting an ester of fumaric acid or maleic acid with a polyamine; and
  b) reacting the unreacted ester of fumaric acid or maleic acid to completion with a secondary heterocyclic amine.

<7> The process of aspect <6> wherein the polyamine in step a) is a cycloaliphatic or acyclic diamine or triamine.

<8> The process of aspect <7> wherein the cycloaliphatic or acyclic diamine or triamine is selected from the group consisting of 2,4'- and/or 4,4'-diaminodicyclohexylmethane, 3,3'-dimethyl-4,4'-diaminodicyclohexylmethane, Bis-(3-methyl-4-aminocyclohexyl) methane, 2,4-diamino-1-methyl cyclohexane, 2,6-diamino-1-methyl cyclohexane, 2,4- and/or 2,6-hexahydrotoluenediamine, ethylene diamine, 1,2-diaminopropane, 1,4-diaminobutane, 1,6-diaminohexane, 2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 4-aminomethyl-1,8-diaminooctane, or tris-(2-aminoethyl)amine.

<9> The process of aspect <6> wherein the secondary heterocyclic amine in step b) is selected from the group consisting of aziridine, azetidine, pyrrolidine, piperidine, piperazine, a 1-N-alkylpiperazine wherein the alkyl contains 1-12 carbon atoms, a 1-N-arylpiperazine wherein the aryl contains 6 carbon atoms, morpholine and azepane.

<10> The process of aspect <7> wherein the molar ratio of diamine to the ester of fumaric acid or maleic acid is in the range of 1:3 to 1:2.

<11> The process of aspect <7> wherein the molar ratio of triamine to the ester of fumaric acid or maleic acid is in the range of 1:4 to 1:3.

<12> The process of aspect <6> wherein the molar ratio of the unreacted ester of fumaric acid or maleic acid to the secondary heterocyclic amine is about 1.0.

<13> The process of aspect <6> wherein the weight ratio of polyaspartic ester to aspartic ester is in the range of 98:2 to 75:25.

EXAMPLES

These Examples are provided to demonstrate certain aspects of the invention and shall not limit the scope of the claims appended hereto.

Example 1. Preparation of Polyaspartic Ester/Aspartic Ester Mixture from Diethyl Maleate, 4,4'-diaminodicyclohexylmethane (PACM) and Piperidine A 2 L glass reactor equipped with a $N_2$ inlet tube, thermocouple and addition funnel was charged with 4,4'-diaminodicyclohexylmethane (PACM) (470.72 g, 2.0 mole) and heated to 80° C. Diethyl maleate (688.8 g, 4 mole) was slowly added while maintaining the temperature at 80-85° C. The mixture was kept at this temperature for 6 h. An oliquot sample analyzed by gas chromatography indicated the presence of 5 wt % (0.32 mole) of diethyl fumarate. Piperidine (27.48 g, 0.32 mole) was added and the mixture was brought to ambient temperature. After 3 days there was no diethyl fumarate detected by gas chromatography.

Example 2 Preparation of Polyaspartic Ester/Aspartic Ester Mixture from Diethyl Maleate, 4,4'-diaminodicyclohexylmethane (PACM) and Pyrrolidine A 2 L glass reactor equipped with a $N_2$ inlet tube, thermocouple and addition funnel was charged with 4,4'-diaminodicyclohexylmethane (PACM) (470.72 g, 2.0 mole) and heated to 80° C. Diethyl maleate (688.8 g, 4 mole) was slowly added while maintaining the temperature at 80-85° C. The mixture was kept at this temperature for 6 h. An oliquot sample analyzed by gas chromatography indicated the presence of 5 wt % (0.32 mole) of diethyl fumarate. Pyrrolidine (22.90 g, 0.32 mole) was added and the mixture was brought to ambient temperature. After 3 days there was no diethyl fumarate detected by gas chromatography.

Example 3. Preparation of Polyaspartic Ester/Aspartic Ester Mixture from Diethyl Maleate, 4,4'-diaminodicyclohexylmethane (PACM) and Piperazine A 2 L glass reactor equipped with a $N_2$ inlet tube, thermocouple and addition funnel was charged with 4,4'-diaminodicyclohexylmethane (PACM) (470.72 g, 2.0 mole) and heated to 80° C. Diethyl maleate (688.8 g, 4 mole) was slowly added while maintaining the temperature at 80-85° C. The mixture was kept at this temperature for 6 h. An oliquot sample analyzed by gas chromatography indicated the presence of 5 wt % (0.32 mole) of diethyl fumarate. Piperazine (27.69 g, 0.32 mole) was added and the mixture was brought to ambient temperature. After 7 days there was no diethyl fumarate detected by gas chromatography.

Example 4. Preparation of Polyaspartic Ester/Aspartic Ester Mixture from Diethyl Maleate, 4,4'-diaminodicyclohexylmethane (PACM) and Morpholine A 2 L glass reactor equipped with a $N_2$ inlet tube, thermocouple and addition funnel was charged with 4,4'-diaminodicyclohexylmethane (PACM) (470.72 g, 2.0 mole) and heated to 80° C. Diethyl maleate (688.8 g, 4 mole) was slowly added while maintaining the temperature at 80-85° C. The mixture was kept at this temperature for 6 h. An oliquot sample analyzed by gas chromatography indicated the presence of 5 wt % (0.32 mole) of diethyl fumarate. Morpholine (27.48 g, 0.32 mole) was added and the mixture was brought to ambient temperature. After 14 days there was no diethyl fumarate detected by gas chromatography.

Example 5

Coating mixtures were prepared by mixing the product from Examples 1 and 2 separately with a polyisocyanate, hexamethylene diisocyanate trimer at a stoichiometric ratio of 1.05 NCO to amine. 138 grams of the polyaspartic ester/aspartic ester mixture was added to the container followed by 100 grams of the hexamethylene diisocyanate trimer, Ancarez ISO HDIT (21.8% NCO). The materials in the container were hand mixed for about 1 to 2 minutes with a spatula to form a homogeneous mixture. The mixtures were then used for different testing including viscosity measurements, dry times and Shore D hardness. A control mixture of polyaspartic ester/aspartic ester mixture from diethyl maleate, 4,4'-diaminodicyclohexylmethane (PACM) with the same polyisocyanate was also prepared for side to side comparison.

Example 6

Viscosity was measured on the neat polyaspartic ester/aspartic ester mixture prepared in Examples 1 and 2 alongside the control using ASTM D2196-10 test method A. The mix viscosity and cure profile of the samples prepared in Example 5 were also measured. The cure profile recorded is the amount of time it takes for the viscosity of the sample to reach 12,000 cP. All the viscosity data are shown in Table 1. Viscosity testing was conducted on a Brookfield Viscometer, model RV-DVIII with a thermosel accessory and a small sample adapter. The chamber required 12 ml of sample and spindle #27 was used for measurements. All viscosity testing was conducted at 25 C.

Example 7

The dry times of the mixture prepared in Example 5 were also measured. A thin coating of about 150 micron was applied by a draw down bar on a 12" by 1" glass slide and placed on BK drying time recorder. The thin needle recording time was set at 2 hours. A set to touch (stage 1) time and tack free (stage 2) time was determined on a dried film by using ASTM D5895. The dry time data are shown in Table 1. All dry time measurements were conducted at 22° C./50% RH.

Example 8

Shore D hardness were measured on the mixture composition prepared in Example 5. A wet mixture was poured into a small circular mold to form a ⅛" coating once it hardened. The hardness was measured on the coating using a Shore D durometer from PTC instruments (model 307L) at 4, 6 and 24 hours using ASTM D2240 method. The shore D hardness data are shown in Table 1. All shore D measurements were conducted at 22° C./50% RH.

TABLE 1

| Coating mixture properties of Polyaspartic ester mixtures reacted with polyisocyanate | | | |
|---|---|---|---|
| Polyisocyanate (HDI Trimer) | Ancarez ISO HDIT | Ancarez ISO HDIT | Ancarez ISO HDIT |
| % NCO | 21.8% | 21.8% | 21.8% |
| Amine Curing agent | Polyaspartic (Example 1) | Polyaspartic (Example 2) | Polyaspartic (Control) |
| Brookfield Viscometer (ASTM D2196-10) - Spindle 27; Torque 10-90%; 25° C. | | | |
| Neat Viscosity (cP): | 691 | 825 | 1150 |
| Mix Viscosity (cP): | 3553 | 2833 | 4233 |
| Time to 12,000 cP (min): | 18 | 29.5 | 21 |
| Dry time (ASTM D5895) - (2 hr. Setting) - 22° C. and 50% Relative humidity | | | |
| Set to touch- Stage 1 (min): | 8 | 8 | 8 |
| Tack free- Stage 2 (min): | 18 | 20 | 18 |
| Shore D Hardness (ASTM D2240) - 22° C. and 50% Relative humidity | | | |
| 4 hrs. | 66 | 40 | 72 |
| 6 hrs. | 70 | 62 | 72 |
| 24 hrs. | 75 | 65 | 76 |

The invention claimed is:
1. A polyurea coating composition comprising
   (A) a polyisocyanate;
   (B) a polyaspartic ester represented by the structure:

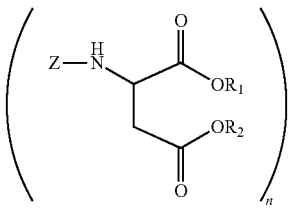

wherein Z=a cycloalkyl, alkyl or aryl group, $R_1$, $R_2$=alkyl groups containing 1-10 carbon atoms; and n=2-4; and
   (C) an aspartic ester derived from a secondary heterocyclic amine in a 4-7 membered ring compound bearing at least one secondary amine functionality, wherein the secondary heterocyclic amine is selected from the group consisting of azetidine, pyrrolidine, piperidine, piperazine, a 1-N-alkylpiperazine wherein the alkyl contains 1-12 carbon atoms, a 1-N-arylpiperazine wherein the aryl contains 6 carbon atoms, morpholine and azepane.
2. The composition of claim 1 wherein Z is the cycloalkyl, alkyl or aryl group attached to at least one of the amino groups of 2,4'- and/or 4,4'-diaminodicyclohexylmethane, 3,3'-dimethyl-4,4'-diaminodicyclohexylmethane, Bis-(3-methyl-4-aminocyclohexyl) methane, 2,4-diamino-1-methyl cyclohexane, 2,6-diamino-1-methyl cyclohexane, 2,4- and/or 2,6-hexahydrotoluenediamine, ethylene diamine, 1,2-diaminopropane, 1,4-diaminobutane, 1,6-diaminohexane, 2,5- diaminohexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 4-aminomethyl-1,8-diaminooctane, tris-(2-aminoethyl)amine, 2,4- and/or 2,6-diaminotoluene, 2,4'- and/or 4,4'-diaminodiphenylamine, or 2,4'- and/or 4,4'-methylenedianiline.

3. The composition of claim 1 wherein the polyisocyanate is selected from the group consisting of 1,4-diisocyanatobutane, 1,6-hexamethylene diisocyanate, 2,2,4- and/or 2,4,4-trimethyl-1,6-hexamethylene diisocyanate, dodecamethylene diisocyanate, 1,4-diisocyanatocyclohexane, 1-isocyanato-3,3,5-trimethyl-5-isocyanatomethylcyclohexane, 2,4'- and/or 4,4'-diisocyanato-dicyclohexyl methane, 2,4- and/or 4,4'-diisocyanatodiphenyl methane, 2,4- and/or 2,6-diisocyanatotoluene, diphenylmethane 4,4'-diisocyanate, diphenylmethane 2,4'-diisocyanate, 2,4- and/or 2,6-diisocyanatotoluene, hexamethylene diisocyanate, isophorone diisocyanate, or 2,4'- and/or 4,4'-diisocyanato-dicyclohexyl methane.

4. A method of preparing a polyurea coating composition comprising reacting a polyaspartic ester represented by the structure below:

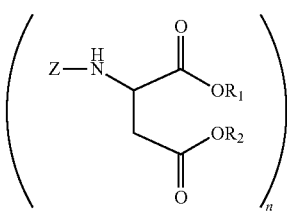

$Z$=a cycloalkyl, alkyl or aryl group, $R_1$, $R_2$=alkyl groups containing 1-10 carbon atoms, and n=2-4, with an aspartic ester of a secondary heterocyclic amine to form a mixture, wherein the secondary heterocyclic amine is selected from the group consisting of azetidine, pyrrolidine, piperidine, piperazine, a 1-N-alkylpiperazine wherein the alkyl contains 1-12 carbon atoms, a 1-N-arylpiperazine wherein the aryl contains 6 carbon atoms, morpholine and azepane, and reacting the mixture with a polyisocyanate.

* * * * *